April 27, 1926.
A. H. LEIPERT
UNIVERSAL JOINT
Filed Sept. 18, 1923
1,582,284
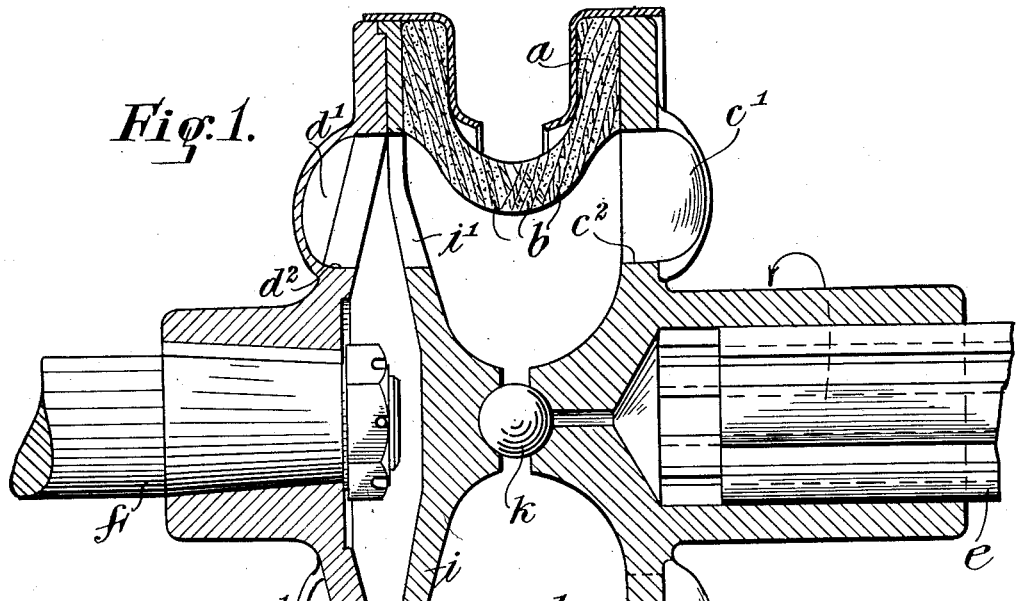
Fig. 1.
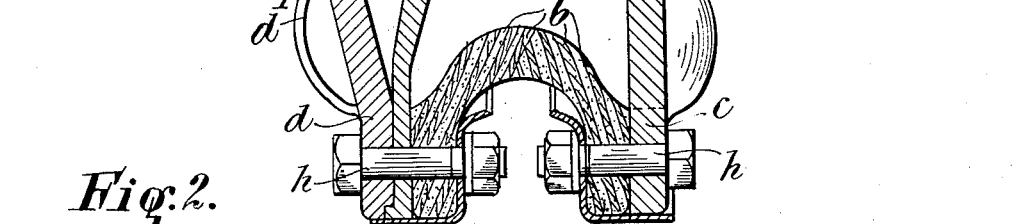
Fig. 2.
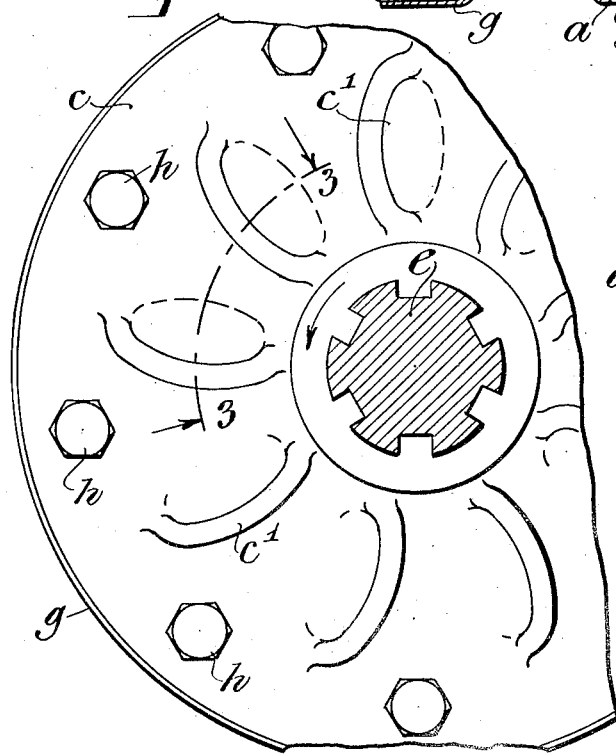
Fig. 3.
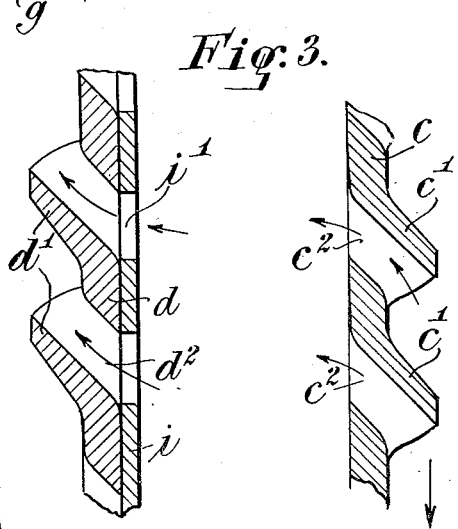
INVENTOR
August H. Leipert
BY
Redding, Greeley, O'Shea & Campbell
ATTORNEYS Patented Apr. 27, 1926.

1,582,284

UNITED STATES PATENT OFFICE.

AUGUST H. LEIPERT, OF NEW YORK, N. Y., ASSIGNOR TO INTERNATIONAL MOTOR COMPANY, OF NEW YORK, N. Y., A CORPORATION OF DELAWARE.

UNIVERSAL JOINT.

Application filed September 18, 1923. Serial No. 663,375.

*To all whom it may concern:*

Be it known that I, AUGUST H. LEIPERT, a citizen of the United States, residing in the borough of Queens of the city of New York, in the State of New York, have invented certain new and useful Improvements in Universal Joints, of which the following is a specification, reference being had to the accompanying drawing, forming a part hereof.

This invention relates to improvements in universal joints and is concerned particularly with the provision of means for cooling the same by an artificially induced current of air in and about the working parts. Universal joints in use provide for constant movement between the associated parts for transmission of forces from two coupled parts whose axes are angularly disposed. Accordingly, the tendency is for a great amount of heat to be generated. This is particularly true with a type of universal joint in which no metal is employed but the driving forces are transmitted from one member to another through non-metallic devices. While the invention is not concerned with the particular form or structure of the universal joint with which the improvements are associated it will be conducive to clearness to refer particularly to one type in which it is desirable to provide for a constant cooling. Such a type is found in a non-metallic disk of rubber or the like of generally hyperbolic cross-sectional form in which the driving forces are transmitted along the cords tangentially disposed. In such a joint as in all other types of universal joints provision is made for constant relative movement between the parts to provide for transmission of power between two angularly disposed rotating members. The result, in the case of a non-metallic joint, constant flexion of the material itself generates heat which it is desirable to carry off as rapidly as possible. The present improvements relate broadly to devices for cooling a universal joint by inducing in and about its working parts a current of air. In the preferred embodiment this current of air is induced by means carried with the joint itself and, indeed, formed as an integral part of certain of the sections so that the joint is wholly self-contained and yet provides for a pumping or blowing action of the air during rotation. As the description proceeds it will be evident that the improvements herein may be adapted to joints of different types and may themselves find different embodiments depending upon the particular design of the joint but variations in such matters will, it is believed, fall within the skill of a mechanic having before him the teaching of the present application.

In the drawings:

Figure 1 is a view in section through a universal joint for transmitting driving forces from a rotating shaft to a second shaft which is angularly disposed with respect thereto and with which the improved cooling devices are associated.

Figure 2 is a fragmentary view in end elevation of the improved joint one of the shafts being shown in section.

Figure 3 is a fragmentary view in section taken along the curved line 3—3 of Figure 2 and looking in the direction of the arrows and showing somewhat schematically the relation of the improved parts for inducing artificially a cooling blast in and around the joint.

As stated hereinbefore, the invention is not limited to the particular nature of the joint with which the improvements are associated but there has been illustrated herein for convenience of description a universal joint consisting of a disk $a$ of non-metallic material such as rubber, of generally hyperbolic cross-sectional form and having embedded therein cross cords $b$ preferably disposed tangentially for the transmission of driving forces. This disk $a$ is coupled to circular flanges $c$, $d$, engaged, respectively, with shaft sections $e$, $f$, the engagement of the disk $c$ with one of the shafts $e$ being through a slip joint, if desired. Annular retaining rings $g$ and through bolts $h$ may serve as securing devices for the disk $b$ with the respective flanges $c$, $d$, as will be understood from the construction of a type of joint now known. If desired, an additional circular centering flange $i$ may be coupled in between one edge of the disk $b$ and one of the flanges $d$ and have at its center a seat to receive a steel centering ball $k$ which is also seated on the center line of the flange $c$ whereby relative angular movement between the two flanges is facilitated. During the course of action of the universal joint described in transmitting driving forces in either direction between the shafts $e$, $f$ which are angularly disposed it will be understood that there is constant adaptation of the universal joint during each rotation to the angularity between the shafts. In the type of joint illustrated this adaptation is effected through flexion within the body of the joint. This generates heat so that it becomes desirable to cool the body of the joint either on the outside or on the inside or on both sides. Air is the most convenient cooling medium. However, mere movement of the joint through the air, as in the case where the joint is mounted on the vehicle creates a cooling action which is unappreciable and is to be removed from consideration in connection with the present invention. However, any means for artificially inducing a current or blast of air in and about the working parts of the joint fall within the scope of the invention. It is thought in accordance with the construction of the preferred form that such means should take the form of a pump or blower action and might well be self-contained, that is, carried directly by the parts of the joint so that the rotative movement thereof at once sets up the desired condition. The flanges $c$, $d$, may be cast or drop-forged or stamped or otherwise formed but it is assumed in the illustrated case that they are drop-forged. In their manufacture, accordingly, it is proposed to employ dies for stamping out during the forming operation inclined vanes $c'$, $d'$, respectively, the metal forming the vanes being punched out in the same operation to leave openings $c^2$ through the flanges for the movement of air into and out of the space within the disk $b$. These vanes may take any desired configuration found to be most convenient in manufacture and most effective to set up a pumping or blowing action but are preferably inclined in one direction or another so as to scoop up the air or expel it depending upon the direction of movement. A series of these vanes may be formed in an annular roll around each flange as shown clearly in Figure 2. The centering disk $i$ may also have suitable openings $i'$ therein communicating with the openings $d^2$ in the flange $d$ so that the continuous flow of air through the space within the disk $b$ is not hindered. Figure 3 shows diagrammatically the course which it might be assumed that a current of air will take when directed in through the movement of the vane $c'$ when the disk $c$ is rotating in a counterclockwise direction. Since the vanes $d'$ are reversely disposed with respect to the vanes $c'$ the discharge of air is facilitated. Reversal in the direction of rotation of the shafts will set up the same condition except that the course of the air will be reversed also.

Aside from the particular pumping and blowing action created by the means described herein it is evident that the vanes might be so disposed as to create a cooling blast in and about the exterior of the disk $b$. Further, instead of forming the vanes as integral parts of the sections of the universal joint they might be attached thereto as independent devices.

All variations in design falling within the skill of the mechanic are to be deemed within the scope of the appended claims provided the desired results are secured by associating with a universal joint devices for inducing artificially a cooling blast of air in and about the working parts thereof.

What I claim is:

1. In a universal joint driving and driven flanges, means to connect said flanges to transmit driving forces therebetween and afford capacity for universal movement and vanes carried with one of said flanges to induce a cooling current of air in and about the connecting means for said flanges.

2. In a universal joint in combination with driving and driven flanges, flexible non-metallic material connecting the flanges to transmit driving forces therebetween and afford capacity for universal movement and means carried with one of said flanges to induce a cooling current of air around the inner surface of said connecting means for the flanges.

3. In a universal joint in combination with driving and driven flanges a non-metallic annulus connecting the same to transmit driving forces and afford capacity for universal movement, said flanges being formed with openings to admit and expel air from within the disk and means carried on the universal joint to induce a cooling current of air through said openings.

4. In a universal joint in combination with driving and driven flanges a non-metallic annulus connecting the same to transmit driving forces and afford capacity for universal movement, said flanges being formed with openings to admit and expel air from within the annulus and reversely disposed vanes carried on the faces of the respective flanges along the edges of said openings to induce a cooling current of air therethrough upon rotation of the flanges.

5. In a universal joint in combination with circular driving and driven flanges, means connecting the same to transmit driving forces therebetween and afford capacity for universal movement and vanes formed in the face of one of the flanges in proximity to openings therethrough to induce a current of air in and about the reverse face of said flange.

This specification signed this 15th day of September A. D. 1923.

AUGUST H. LEIPERT.